(12) United States Patent
Huh et al.

(10) Patent No.: US 11,484,925 B2
(45) Date of Patent: Nov. 1, 2022

(54) APPARATUS FOR CUTTING MATERIAL AND SYSTEM FOR CUTTING MATERIAL

(71) Applicant: POSCO, Pohang-si (KR)

(72) Inventors: Hyeong-Jun Huh, Gwangyang-si (KR); Choong-Soo Lim, Gwangyang-si (KR); Sung-Joon Kwak, Gwangyang-si (KR)

(73) Assignee: POSCO, Pohang-si (KR)

( * ) Notice: Subject to any disclaimer, the term of this patent is extended or adjusted under 35 U.S.C. 154(b) by 967 days.

(21) Appl. No.: 16/316,899

(22) PCT Filed: Jul. 11, 2017

(86) PCT No.: PCT/KR2017/007393
§ 371 (c)(1),
(2) Date: Jan. 10, 2019

(87) PCT Pub. No.: WO2018/012844
PCT Pub. Date: Jan. 18, 2018

(65) Prior Publication Data
US 2019/0291154 A1 Sep. 26, 2019

(30) Foreign Application Priority Data

Jul. 11, 2016 (KR) .................. 10-2016-0087426

(51) Int. Cl.
*B21B 45/00* (2006.01)
*B21B 15/00* (2006.01)
*B23D 19/04* (2006.01)

(52) U.S. Cl.
CPC ............ *B21B 45/008* (2013.01); *B21B 15/00* (2013.01); *B21B 15/0007* (2013.01);
(Continued)

(58) Field of Classification Search
CPC ........ B21D 19/06; B21D 19/04; B21D 37/16; B23K 26/359; B23K 26/60; B23K 26/38;
(Continued)

(56) References Cited

U.S. PATENT DOCUMENTS 2,251,313 A * 8/1941 Yoder .................... B23D 19/06
83/492
4,356,376 A 10/1982 Komanduri et al.
(Continued)

FOREIGN PATENT DOCUMENTS

CN 101196612 A 6/2008
CN 102112265 A 6/2011
(Continued)

OTHER PUBLICATIONS

Lim, Translation of WO-2015093675-A1 (Year: 2015).*
(Continued)

*Primary Examiner* — Adam J Eiseman
*Assistant Examiner* — Bobby Yeonjin Kim
(74) *Attorney, Agent, or Firm* — Morgan, Lewis & Bockius LLP

(57) ABSTRACT

The present invention provides an apparatus for cutting a material, comprising: a frame body installed on a conveying path of a material; a cutting means, mounted on the frame body, for cutting an end portion of the material being conveyed; a laser preheating means for preheating the material by irradiating a laser beam onto the material before being conveyed to the cutting means; and a blocking and reflection means for blocking the laser beams reflected to the cutting means and re-reflecting the laser beam to the material.

10 Claims, 6 Drawing Sheets

(52) U.S. Cl.
CPC ............ *B21B 45/004* (2013.01); *B23D 19/04* (2013.01); *B21B 2015/0021* (2013.01); *B21B 2203/12* (2013.01)

(58) Field of Classification Search
CPC .. B23K 26/048; B23K 26/364; B23K 26/142; B21B 15/00; B21B 2203/12; B21B 45/004; B21B 45/008; B21B 2015/0021; B21B 15/0007; B23D 19/04
USPC .................................. 72/342.1–342.96, 203
See application file for complete search history.

(56) References Cited

U.S. PATENT DOCUMENTS

| | | | |
|---|---|---|---|
| 2004/0104207 | A1 | 6/2004 | Wu et al. |
| 2011/0133365 | A1* | 6/2011 | Ushimaru ............ B23K 26/382 264/161 |
| 2011/0284503 | A1* | 11/2011 | Simpson ............ B23K 26/0676 219/121.28 |
| 2013/0032015 | A1 | 2/2013 | Nishikawa |
| 2015/0190886 | A1 | 7/2015 | Huonker |
| 2015/0217418 | A1* | 8/2015 | Yamashida ............ B23B 27/20 407/115 |
| 2016/0005654 | A1 | 1/2016 | Song et al. |
| 2016/0318121 | A1 | 11/2016 | Lim et al. |
| 2017/0266712 | A1 | 9/2017 | Traenklein |

FOREIGN PATENT DOCUMENTS

| | | | | |
|---|---|---|---|---|
| CN | 102768973 | A | 11/2012 | |
| DE | 19616327 | A1 | 11/1997 | |
| DE | 102013018698 | A1 | 5/2015 | |
| GB | 2488779 | A * | 9/2012 | .......... B21D 31/043 |
| JP | S63-238991 | A | 10/1988 | |
| JP | H02-133281 | U | 11/1990 | |
| JP | H05-212572 | A | 8/1993 | |
| JP | H08-090262 | A | 4/1996 | |
| JP | 2000-127090 | A | 5/2000 | |
| JP | 3774536 | B2 | 2/2006 | |
| JP | 2008-250001 | A | 10/2008 | |
| JP | 2011-210915 | A | 10/2011 | |
| JP | 2012-106325 | A | 6/2012 | |
| JP | 2012-130969 | A | 7/2012 | |
| JP | 2013-035069 | A | 2/2013 | |
| JP | 2017-177322 | A | 10/2017 | |
| KR | 10-0728592 | B1 | 6/2007 | |
| KR | 10-2010-0107814 | A | 10/2010 | |
| KR | 10-2012-0017833 | A | 2/2012 | |
| KR | 10-2015-0073565 | A | 7/2015 | |
| WO | 2014/050467 | A1 | 4/2014 | |
| WO | 2015093675 | A1 | 6/2015 | |
| WO | WO-2015093675 | A1 * | 6/2015 | .......... B21B 15/0007 |

OTHER PUBLICATIONS

Clark, Translation of GB-2488779-A (Year: 2012).*
Chinese Office Action dated Sep. 6, 2019 issued in Chinese Patent Application No. 201780040240.6 (with English translation).
Japanese Office Action dated Nov. 12, 2019 issued in Japanese Patent Application No. 2019-500787 (with English translation).
International Search Report issued in corresponding International Patent Application No. PCT/KR2017/007393 dated Sep. 22, 2017.
European Search Report dated May 7, 2019 issued in European Patent Application No. 17827915.4.

* cited by examiner

【FIG. 1a】
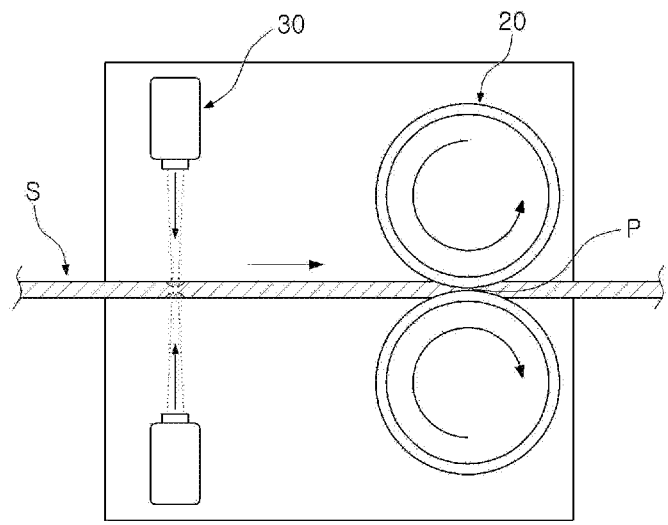
【FIG. 1b】
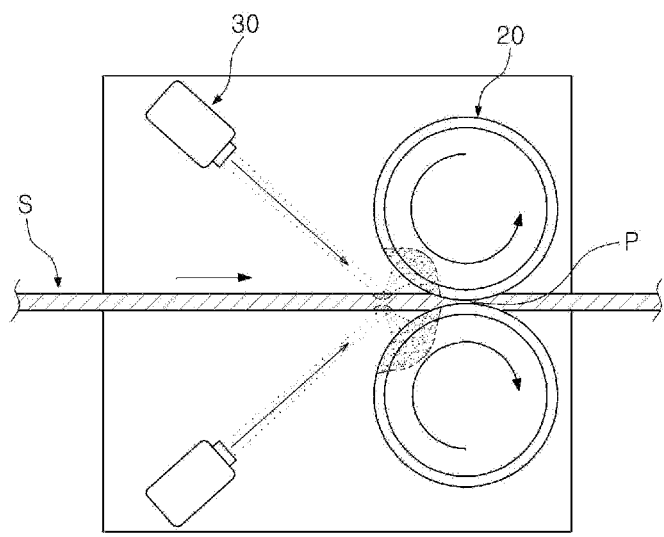

[FIG. 2]
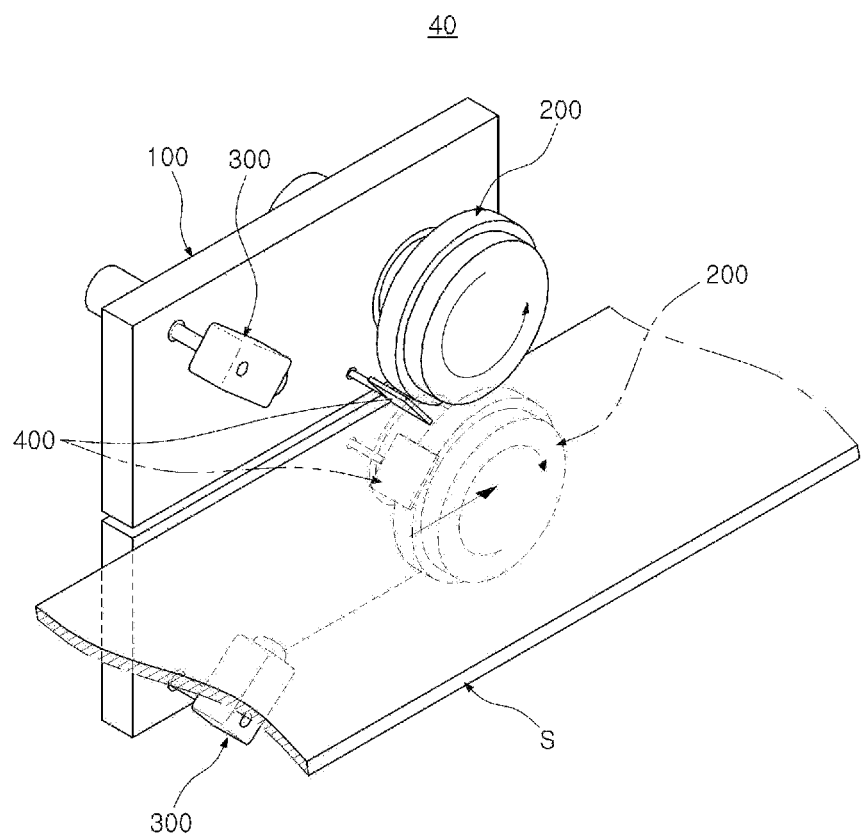

【FIG. 3】
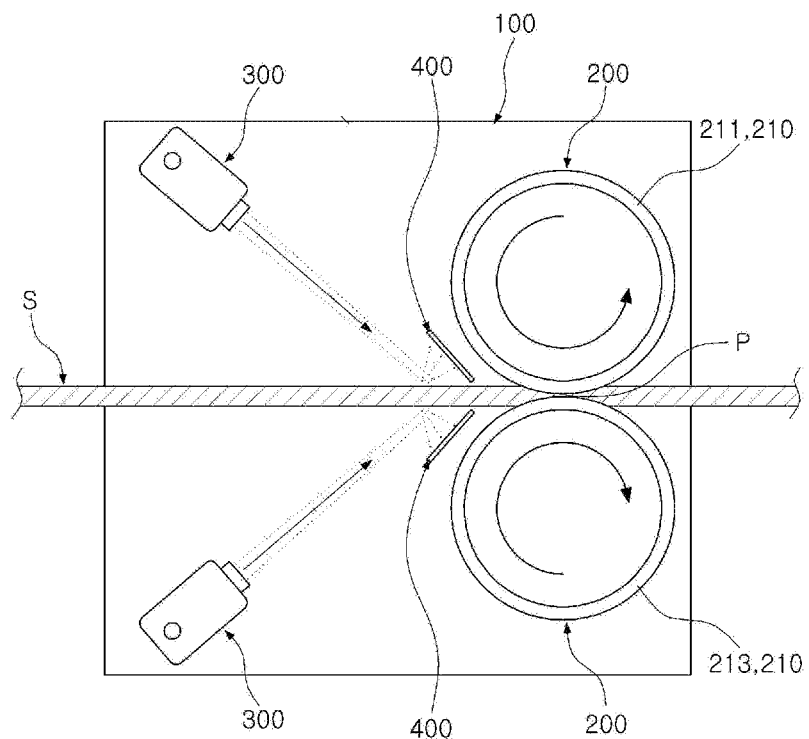
【FIG. 4a】
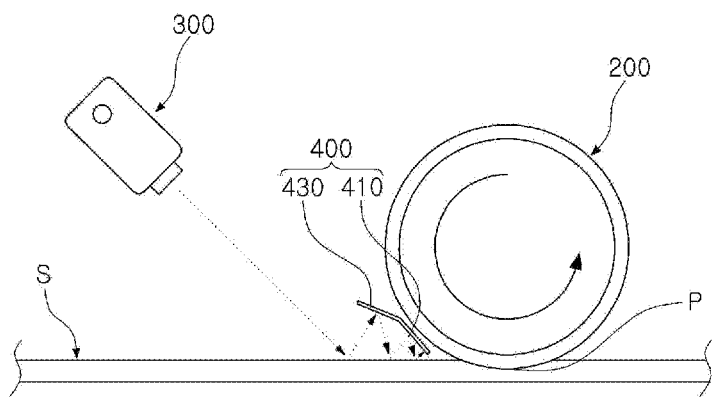

[FIG. 4b]
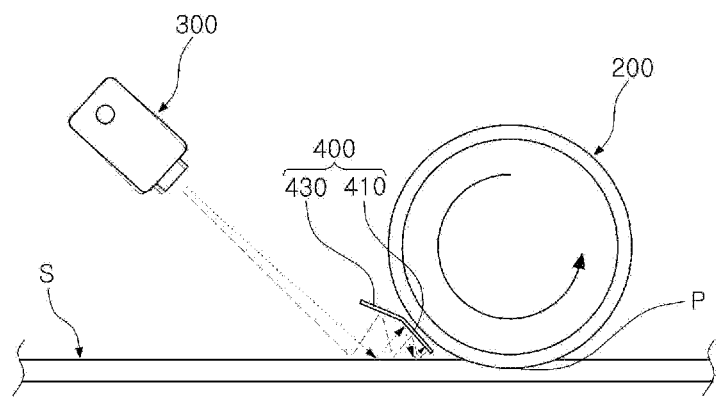
[FIG. 5]
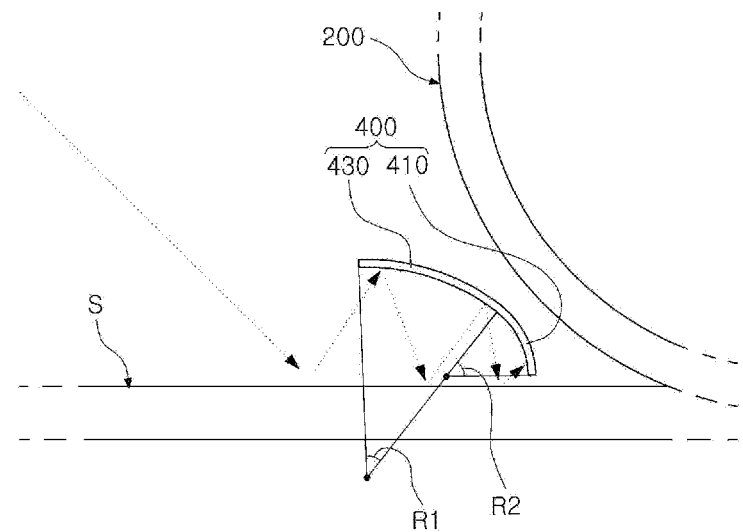

[FIG. 6]
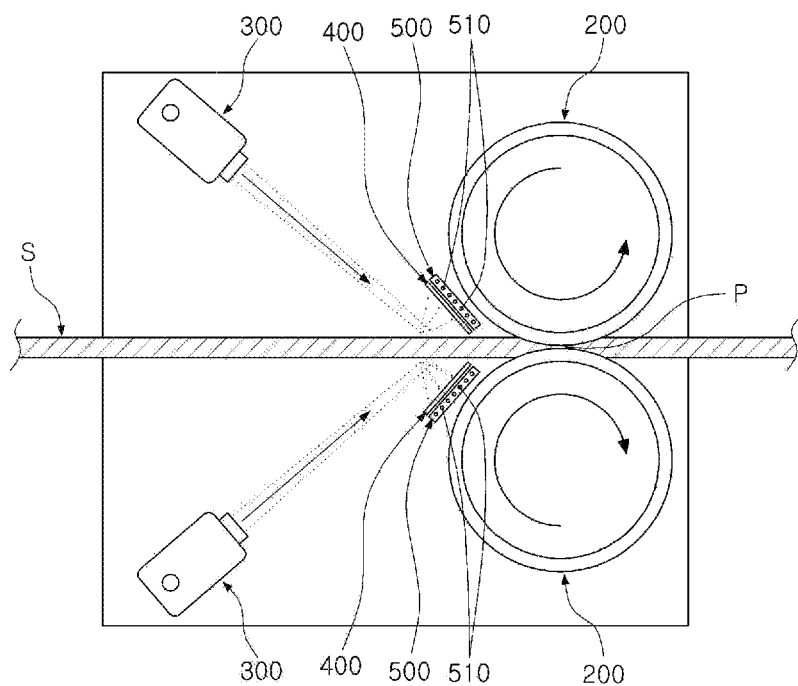

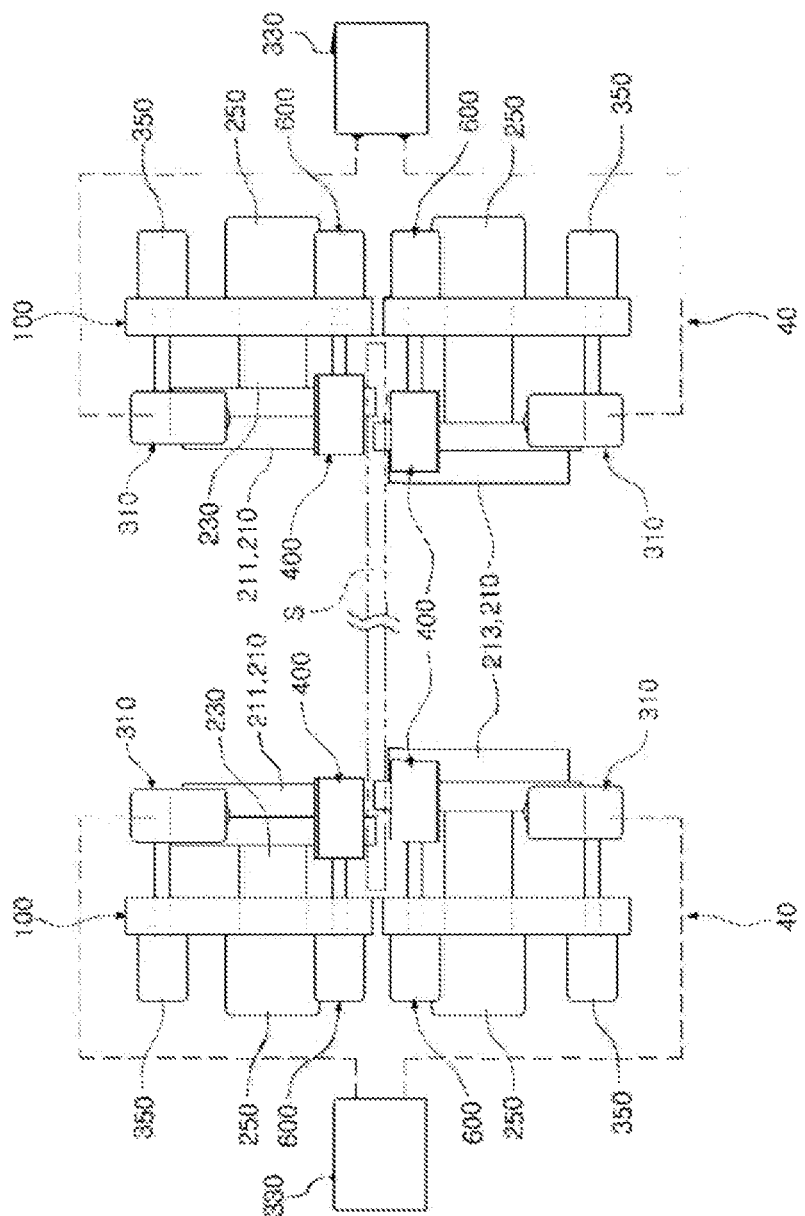
[Fig. 7]

APPARATUS FOR CUTTING MATERIAL AND SYSTEM FOR CUTTING MATERIAL

CROSS REFERENCE

This patent application is the U.S. National Phase under 35 U.S.C. § 371 of International Application No. PCT/KR2017/007393, filed on Jul. 11, 2017, which claims the benefit of Korean Patent Application No. 10-2016-0087426, filed on Jul. 11, 2016, the entire contents of each are hereby incorporated by reference.

TECHNICAL FIELD

The present disclosure relates to an apparatus for cutting a material and a system for cutting a material, cutting a widthwise end portion of a material, to accurately process a material in a widthwise dimension.

BACKGROUND ART

It should be noted that the contents described in this section merely provide background information on the present inventive concept and do not constitute the prior art.

In a cutting process of a material, breakage of a cutting means occurs due to various reasons, as a production of high strength steel increases, breakage frequency of the cutting means such as a knife, or the like, increases, as a ratio of the high strength steel of the material in the cutting process is increased.

When the breakage of the cutting means occurs, a cut surface of a cut product may be defective and there may be a problem such as an increase in working time due to replacement of the knife, or the like. Therefore, techniques to extend the life of the knife by various methods, such as changing the material of the knife or applying ultrasonic waves thereto, or the like, to perform the surface treatment, have been developed.

Further, a method in which a temperature of a material is raised to lower the strength of the material to prevent the breakage of the knife has been introduced.

Local heating of the material by a laser beam proceeds instantaneously and a cooling proceeds rapidly after a preheating process.

Thus, as illustrated in FIG. 1A, when a portion to be preheated by a preheating means 30 is moved excessively far from a cutting point P of a material S by a cutting means 20, the material may be rapidly cooled to lower preheating efficiency.

Therefore, as illustrated in FIG. 1B, to rapidly cut the material S with the cutting means 20, before the material S, preheated by the preheating means 30, is cooled, laser preheating should be performed close to a position at which the material is cut by the cutting means 20.

However, the laser beam reflected from the surface of the material raises a temperature of the cutting means and the raised temperature causes the cutting means to have a high degree of fatigue due to heat, and to change an alignment state between the cutting means, such that there may be a problem in which cutting performance is deteriorated due to the change of the cutting condition and a mechanical breakdown occurs.

In addition, even though the laser beam varies, depending on the surface condition of the material, only about 50% of the laser beam is absorbed and a remainder is reflected due to a scattering pattern on the surface.

Therefore, there may be a problem in which preheating efficiency is lowered due to a characteristic in which the laser beam is reflected from the surface of the material.

DISCLOSURE

Technical Problem

The present disclosure is realized by recognizing at least one requirement, problem, or the like occurring in the apparatus for cutting the material of the related art, as described above.

As an aspect of the present disclosure, an apparatus for cutting a material capable of preheating a material before cutting and preventing heating of equipment by a heat source for preheating is provided.

As an aspect of the present disclosure, an apparatus for cutting a material capable of preheating a material, before cutting and improving preheating efficiency of the material, is provided.

Technical Solution

According to an aspect of the present disclosure, an apparatus for cutting a material includes: a frame body installed on a conveying path of a material; a cutting means mounted on the frame body and cutting an end portion of the material being conveyed; a laser preheating means preheating the material by irradiating a laser beam onto the material before the material is conveyed to the cutting means; and a blocking and reflection means blocking the laser beam reflected to the cutting means and re-reflecting the laser beam to the material.

Preferably, the blocking and reflection means may re-reflect the laser beam reflected from the material to the material by a combination of at least two or more block reflecting plates having different angles of inclination with respect to a surface of the material.

Preferably, the blocking and reflection means may include a first block reflecting plate installed while having a first inclination angle with respect to the surface of the material; and a second block reflecting plate connected to the first block reflecting plate and having a second inclination angle relatively smaller than the first inclination angle.

Preferably, the first block reflecting plate may include a curved first reflecting surface having a first radius of curvature, and the second block reflecting plate may be connected to the first block reflecting plate, and have a second radius of curvature relatively smaller than that of the first block reflecting plate.

Preferably, the blocking and reflection means may re-reflect the laser beam reflected from the material to the material by a combination of at least two or more block reflecting plate members having different radii of curvature.

Preferably, a cooling means provided between the blocking and reflection means and the cutting means and provided to block heat transfer in a direction of the cutting means, including a cooling line through which a cooling medium flows is further included.

Preferably, a reflecting plate driving means rotating the blocking and reflection means such that a reflection direction of the laser beam reflected from the material may be adjusted may be further included.

Preferably, a cutting means includes an upper cutting wheel installed on the frame body and cutting a material while being in contact with an upper surface of the material; and a lower cutting wheel installed on the frame body and cutting a material together with the upper cutting wheel while being contact with a lower surface of the material, and the laser preheating means may include an upper preheating means installed on the frame body and irradiating a laser beam onto an upper surface of a material to preheat the material before reaching the upper cutting wheel; and a lower preheating means installed on the frame body and irradiating a laser beam to a lower surface of a material to preheat the material before reaching the lower cutting wheel.

Preferably, the laser preheating means may include a preheating head mounted on the frame body and irradiating a laser beam to a material; a laser oscillator supplying a laser beam to the preheating head; and a head driving means adjusting a preheating position of a material by rotating the preheating head in a state in which the preheating head is mounted on the frame body.

According to another aspect of the present disclosure, a system for cutting a material in which a pair of apparatuses for cutting a material are disposed with the material therebetween to simultaneously cut both edge portions in the width direction of the material is provided.

Advantageous Effects

According to an exemplary embodiment in the present disclosure as described above, a material is preheated before cutting, a laser beam reflected from the material is blocked to prevent equipment from being heated by a heat source for preheating, thereby preventing the equipment from being damaged.

According to an exemplary embodiment in the present disclosure, a material is preheated before cutting, a laser beam reflected from the material is reflected back to the material to improve preheating efficiency.

DESCRIPTION OF DRAWINGS

FIG. 1A is a view illustrating an example of a preheating method of a material using a laser beam.

FIG. 1B is a view illustrating another example of a preheating method of a material using a laser beam.

FIG. 2 is perspective view of an apparatus for cutting a material according to an exemplary embodiment in the present disclosure.

FIG. 3 is a side view of an apparatus for cutting a material according to an exemplary embodiment in the present disclosure.

FIGS. 4A and 4B of are side views of an apparatus for cutting a material according to another exemplary embodiment in the present disclosure.

FIG. 5 is a side view of an apparatus for cutting a material according to another exemplary embodiment in the present disclosure.

FIG. 6 is a side view of an apparatus for cutting a material according to another exemplary embodiment in the present disclosure.

FIG. 7 is a front view of an apparatus for cutting a material according to an exemplary embodiment in the present disclosure.

BEST MODE FOR INVENTION

Hereinafter, exemplary embodiments of the present disclosure will be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity.

Hereinafter, an apparatus for cutting a material 40 according to an exemplary embodiment in the present disclosure will be described with reference to the drawings.

Referring to FIG. 2, the apparatus for cutting the material 40 according to an exemplary embodiment in the present disclosure may include a frame body 100, a cutting means 200, and a blocking and reflection means 400, and may further include a cooling means 500 and a reflecting plate driving means 600.

As illustrated in FIG. 2, the frame body 100 installed on a conveying path of a material S, the cutting means 200 mounted on the frame body 100 and cutting an end portion of the material S being conveyed, the laser preheating means 300 preheating the material by irradiating a laser beam onto the material S before being conveyed to the cutting means 200, and the blocking and reflection means 400 blocking the laser beam reflected to the cutting means and re-reflecting the laser beam to the material S may be included.

As illustrated in FIG. 2, the frame body 100 may be installed to be spaced apart from at least one end portion area of the material S to be conveyed to the outside at regular intervals.

The apparatus for cutting the material is installed on the frame body 100, and cuts side portions of the material S to be continuously conveyed in the width direction to process the material S into a desired dimension.

The cutting apparatus may include a rotary shaft 230 rotatably installed on the frame body 100, a cutting wheel 210 installed on the rotary shaft 230 to continuously cut the material S, and a cutting driving means 250 rotating the rotary shaft 230.

The material S to be cut by the cutting means 200 may be composed of a strip which is continuously conveyed in a rolling process.

At this time, the frame body 100 is a frame member in which the cutting means 200 is installed, the structure and the shape of the frame thereof are not limited to the present disclosure, but only the rigid support and installation space of the cutting means is taken into consideration.

In addition, although are not illustrated in the drawings, the cutting means 200 may utilize a cutting wheel as an example, and any cutting member capable of easily cutting the material S without being limited by the present disclosure may be utilized.

The laser preheating means 300 is a component for preliminarily heating a periphery of a portion to be cut before the material S is cut by the cutting means 200.

The laser preheating means 300 may irradiate the laser beam to the material S to rapidly heat the portion to be cut locally before being conveyed to the cutting means 200.

As described above, by locally heating the material S to be cut by the laser beam, the thermal influence exerted on the remaining portion excluding the portion to be cut may be significantly reduced.

And, the material S to be cut may be heated in advance to speed up the cutting process of the material S, thereby improving the operation productivity of the equipment.

However, when the material S is preheated by the laser preheating means 300, although it depends on the surface state of the material S being conveyed, in the case of the strip of the cold rolling process, about only 50% of the irradiated laser beam is absorbed into the material S to preheat the material S, and the remainder is reflected.

Therefore, the apparatus for cutting the material 40 of the present disclosure considers the installation of the blocking and reflection means 400 for improving the preheating efficiency of the material S.

As illustrated in FIG. 3, the blocking and reflection means 400 is an apparatus installed on a front surface of the cutting means 200 and blocking the laser beam reflected by the material S and reflecting the laser beam to the material S.

The blocking and reflection means 400 may be installed on the front surface of the cutting means 200 to block the cutting means 200 from the laser beam reflected from the material S to prevent thermal deformation of the cutting means 200, and may reflect the reflected laser beam again to the material S to improve the preheating efficiency of the material S.

The blocking and reflection means 400 may re-reflect the laser beam reflected from the material S to the material S by a combination of at least two or more block reflecting plates having different angles of inclination with respect to the surface of the material S.

The block reflecting plate may distribute the laser beam reflected from the material S by the combination of at least two or more block reflecting plates having different angles of inclination in the predetermined direction and reflect the laser beam to the material S again.

Although it is illustrated and described in the present specification that the blocking and reflection means 400 in combination with two block reflecting plates is illustrated, but it is not necessarily limited thereto, and three or more block reflecting plates may be combined and formed.

As illustrated in FIGS. 4A and 4B, the blocking and reflection means 400 may include a first block reflecting plate 410 and a second reflecting plate 430.

The blocking and reflection means 400 may include the first block reflecting plate 410 installed with a first inclination angle with respect to the surface of the material S and a second block reflecting plate 420 connected to the first block reflecting plate 410 and having a second inclination angle relatively smaller than the first inclination angle.

As illustrated in FIGS. 4A and 4B, the laser preheating means 300 may be rotatably installed on the frame body 100 by the head driving means 350, and thus a preheating start point of the material S may be adjusted.

As described above, the preheating start point of the material S may be adjusted according to the conveying speed of the material S by adjusting the preheating start point of the material S by rotating the laser preheating means 300.

As illustrated in FIG. 4A, when the conveying speed of the material S is relatively fast, the preheating start point of the material S may be moved away from a cutting point P of the material S to sufficiently preheat the material S.

At this time, the laser beam irradiated from the laser preheating means 300 is heated by the material S and is reflected to the material S, and the reflected laser beam is reflected back from the second block reflecting plate 430 to the material S, and the laser beam reflected back from the material S is reflected back from the first block reflecting plate 410 to the material S such that the material S may be preheated while the material S is superimposed.

As illustrated in FIG. 4B, when the conveying speed of the material S is relatively slow, the preheating start point of the material S may be closer to the cutting point P of the material S as compared with the case illustrated in FIG. 4A.

At this time, the laser beam irradiated from the laser preheating means 300 may be heated by the material S and be reflected to the material S, and the reflected laser beam may be reflected back from the first block reflecting plate 410 to the material S to preheat the material S.

As illustrated in FIG. 5, the first block reflecting plate 410 may include a curved first reflecting surface having a first radius of curvature R1, and the second block reflecting plate 430 may include a second reflecting surface connected to the first block reflecting plate 410 and having a second radius of curvature R2 relatively smaller than that of the first block reflecting plate 410.

A focal distance of the first block reflecting plate 410 in which the first reflecting surface having the relatively large first radius of curvature R1 is relatively longer than that of the second block reflecting plate 430.

A focal distance of the second block reflecting plate 430 in which the second reflecting surface having a relatively small radius of curvature R2 is relatively shorter than that of the first block reflecting plate 410.

As described above, the first block reflecting plate 410 and the second block reflecting plate 430, having different focal distances may be combined to improve the heating efficiency of the material S by distributing the laser beam reflected from the material S in a predetermined direction.

As illustrated in FIG. 5, the blocking and reflection means 400 may re-reflect the laser beam reflected from the material S by a combination of at least two or more block reflecting plates having different radii of curvature to the material S.

The heating efficiency of the material S may be improved by distributing the laser beam reflected from the material S in a predetermined direction by the combination of at least two or more block reflecting plates.

The blocking and reflection means 400 may include the first block reflecting plate 410 having the first radius of curvature R1 and the second block reflecting plate 430 connected to the first block reflecting plate 410, and having the second radius of curvature R2 relatively smaller than that of the first block reflecting plate 410.

The blocking and reflection means 400 may further include a side blocking plate (not illustrated) blocking both side portions of the first block reflecting plate 410 and the second block reflecting plate 430, which are continuously installed.

As illustrated in FIG. 6, the apparatus for cutting the material 40 may further include a cooling means 500 provided between the blocking and reflection means 400 and the cutting means 200, and including a cooling line through which a cooling medium flows and provided so as to block heat transfer in the direction of the cutting means 200.

The cooling means 500 may be installed being spaced apart from a back surface of the blocking and reflection means 400 at predetermined intervals.

The cooling means 500 may include a cooling frame, a cooling line 510 embedded in an inside the cooling frame and cooling the cooling frame while the cooling medium continuously flows, and a cooling tank supplying the cooling medium to the cooling line 510.

The cooling line 510 may be configured such that a plurality of cooling pipes are disposed to be spaced apart in at least one direction of the cooling frame, and adjacent cooling pipes are interconnected to continuously form a flow path.

An overheating of the blocking and reflection means 400 may occur because the laser beam is continuously reflected from the blocking and reflection means 400. The cooling means 500 may prevent an overheating of the cutting means 200m which may occur when the heat of the blocking and reflection means 400, which is overheated is transferred to the cutting means 200.

As illustrated in FIG. 7, a reflecting plate driving means 600 rotating the blocking and reflection means 400 such that the reflection direction of the laser beam reflected from the material S is adjusted may be further included.

As illustrated in FIGS. 2 and 3, the cutting means 200 may include an upper cutting wheel 211 and a lower cutting wheel 213.

The cutting means 200 may include the upper cutting wheel 211 installed on the frame body 100 and cutting the material S while being in contact with the upper surface of the material S and the lower cutting wheel installed on the frame body 100 and cutting the material S together with the upper cutting wheel 211 while being in contact with the lower surface of the material S.

As illustrated in FIGS. 2 and 3, the laser preheating means 300 may include an upper preheating means and a lower preheating means.

The laser preheating means 300 may include the upper preheating means installed on the frame body 100, and irradiating a laser beam to an upper surface of a material S to preheat the material S before reaching the upper cutting wheel and the lower preheating means installed on the frame body, and irradiating a laser beam to a lower surface of a material S to preheat the material S before reaching the lower cutting wheel.

As illustrated in FIG. 7, the laser preheating means 300 may include a preheating head 300, a laser oscillator 330, and a head driving means 350.

The laser preheating means 300 may include the preheating head 310 mounted on the frame body 100 to irradiate the laser beam to the material S, the laser oscillator 330 supplying the laser beam to the preheating head 310, and the head driving means 350 adjusting the preheating position of the material S by rotating the preheating head 310 in a state in which the preheating head 310 is mounted on the frame body 100.

The preheating head 310 is an apparatus locally rapidly heating a portion of the material S to be cut by irradiating the laser beam to the material S before being conveyed to the cutting means 200.

As described above, by locally heating the material S to be cut by the laser beam, the thermal influence exerted on the remaining portion excluding the portion to be cut may be significantly reduced.

The preheating head 310 may be rotatably installed on the frame body 100 by the head driving means 350 and may adjust the preheating start point of the material S according to the conveying speed of the material S.

Hereinafter, an apparatus for cutting a material according to an exemplary embodiment in the present disclosure will be described in detail with reference to the drawings.

As illustrated in FIG. 7, in a system for cutting a material, a pair of apparatuses for cutting a material 40 may be disposed with a material S interposed therebetween, such that both end portions of the material S in the width direction may be cut at the same time and the material S may be processed into a desired width.

A pair of apparatuses for cutting a material 40 may be disposed to face each other with the material S therebetween.

A system for cutting a material may include a first apparatus for cutting a material 40 provided to cut one edge portion of the material S and a second apparatus for cutting a material 40 provided to cut the other edge portion of the material S.

Further, various exemplary embodiments of the apparatus for cutting the material 40 having various exemplary embodiments described above may be applied in the manufacturing method of the present disclosure.

Therefore, the configuration of the frame body 100, the cutting means 200, the laser preheating means 300, and the blocking and reflection means 400 used in the system for cutting the material is the same as the configuration of the apparatus for cutting the material 40, accordingly, a detailed description thereof is omitted to avoid redundancy.

While exemplary embodiments have been shown and described above, it will be apparent to those skilled in the art that modifications and variations could be made without departing from the scope of the present invention as defined by the appended claims.

The invention claimed is:

1. An apparatus for cutting a material comprising:
a frame body installed on a conveying path of a material;
a cutting means mounted on the frame body and configured to cut an end portion of the material being conveyed;
a laser preheating means configured to preheat the material by irradiating a laser beam onto the material before the material is conveyed to the cutting means; and
a blocking and reflection means, spaced from the laser preheating means, installed in front of a front surface of the cutting means and configured to block the laser beam reflected to the cutting means and to re-reflect the laser beam to the material.

2. The apparatus of claim 1, wherein the blocking and reflection means re-reflects the laser beam reflected from the material to the material by a combination of at least two or more block reflecting plates having different angles of inclination with respect to a surface of the material.

3. The apparatus of claim 1, wherein the blocking and reflection means comprises a first block reflecting plate installed to have a first inclination angle with respect to the surface of the material and a second block reflecting plate connected to the first block reflecting plate and having a second inclination angle relatively smaller than the first inclination angle.

4. The apparatus of claim 3, wherein the first block reflecting plate comprises a curved first reflecting surface having a first radius of curvature, and the second block reflecting plate is connected to the first block reflecting plate, and comprises a curved second reflecting surface having a second radius of curvature relatively larger than that of the first block reflecting plate.

5. The apparatus of claim 1, wherein the blocking and reflection means re-reflects the laser beam reflected from the material to the material by a combination of at least two or more block reflecting plate members having different radii of curvature.

6. The apparatus of claim 1, further comprising a cooling means provided between the blocking and reflection means and the cutting means, provided to block heat transfer in a direction of the cutting means, including a cooling line through which a cooling medium flows.

7. The apparatus of claim 1, wherein the blocking and reflection means is configured to be rotated such that a reflection direction of the laser beam reflected from the material is adjusted.

8. The apparatus of claim 1, wherein the cutting means comprises an upper cutting wheel installed on the frame body and cutting a material while being in contact with the upper surface of the material; and
- a lower cutting wheel installed on the frame body and cutting a material together with the upper cutting wheel while being in contact with the lower surface of the material, and
- the laser preheating means comprises an upper preheating means installed on the frame body and irradiating the laser beam onto the upper surface of the material to preheat the material before reaching the upper cutting wheel; and
- a lower preheating means installed on the frame body and irradiating the laser beam onto the lower surface of the material to preheat the material before reaching the lower cutting wheel.

9. The apparatus claim 8, wherein the laser preheating means comprises a preheating head mounted on the frame body and irradiating the laser beam onto the material; and
- a laser oscillator supplying the laser beam to the preheating head, and
- wherein a preheating position of the material is configured to be adjusted by rotating the preheating head while mounted on the frame body.

10. A system for cutting a material, wherein a pair of apparatuses for cutting a material according to claim 1 are disposed with a material therebetween, and are configured to simultaneously cut both edge portions of the material in the width direction of the material.

\* \* \* \* \*